United States Patent
Engl et al.

Patent Number: 6,065,446
Date of Patent: May 23, 2000

[54] METHOD FOR CONTROLLING AN INTERNAL COMBUSTION ENGINE

[75] Inventors: Maximilian Engl, Friedberg; Willibald Schürz, Aufhausen; Johann Fröhlich, Landshut, all of Germany

[73] Assignee: Siemens Aktiengesellschaft, Munich, Germany

[21] Appl. No.: 09/160,878

[22] Filed: Sep. 25, 1998

Related U.S. Application Data

[63] Continuation of application No. PCT/DE97/00620, Mar. 26, 1997, abandoned.

[30] Foreign Application Priority Data

Mar. 28, 1996 [DE] Germany .......................... 196 12 455

[51] Int. Cl.[7] .................................................. F02D 41/14
[52] U.S. Cl. ........................... 123/325; 123/350; 701/110
[58] Field of Search ..................................... 123/325, 326, 123/320, 350, 396, 399; 701/110

[56] References Cited

U.S. PATENT DOCUMENTS

| | | | |
|---|---|---|---|
| 5,245,966 | 9/1993 | Zhang et al. | 123/350 |
| 5,605,131 | 2/1997 | Ohno et al. | 123/399 |
| 5,623,906 | 4/1997 | Storhok | 123/399 |
| 5,921,219 | 7/1999 | Fröhlich et al. | 123/350 |

FOREIGN PATENT DOCUMENTS

| | | |
|---|---|---|
| 4232973A1 | 4/1994 | Germany . |
| 19509139A1 | 11/1995 | Germany . |

*Primary Examiner*—Andrew M. Dolinar
*Attorney, Agent, or Firm*—Herbert L. Lerner; Laurence A. Greenberg; Werner H. Stemer

[57] ABSTRACT

A setpoint torque is determined from a torque factor, a maximum torque and a minimum torque. The torque factor is derived from a pedal value and a rotational speed. The maximum and minimum torques are determined as a function of the rotational speed, a loss torque and engine performance parameters. The loss torque is determined as a function of the rotational speed and the performance parameters.

10 Claims, 6 Drawing Sheets

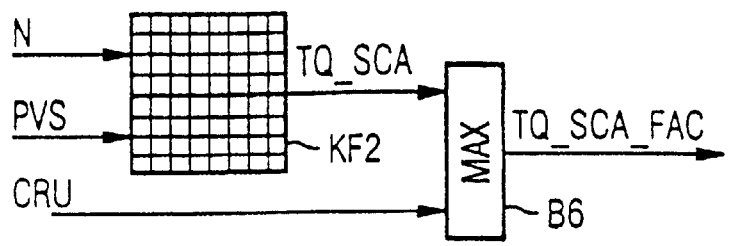
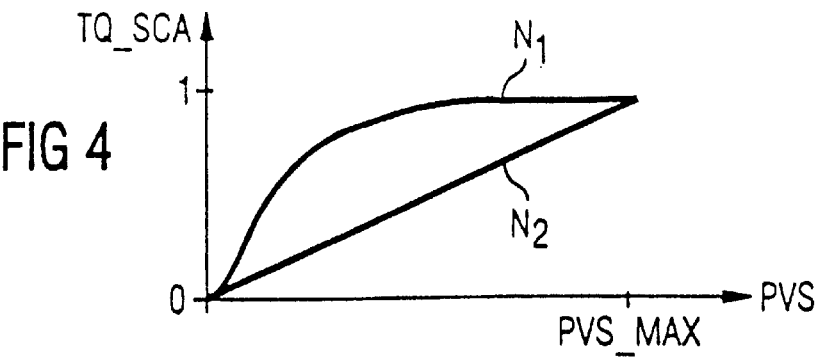
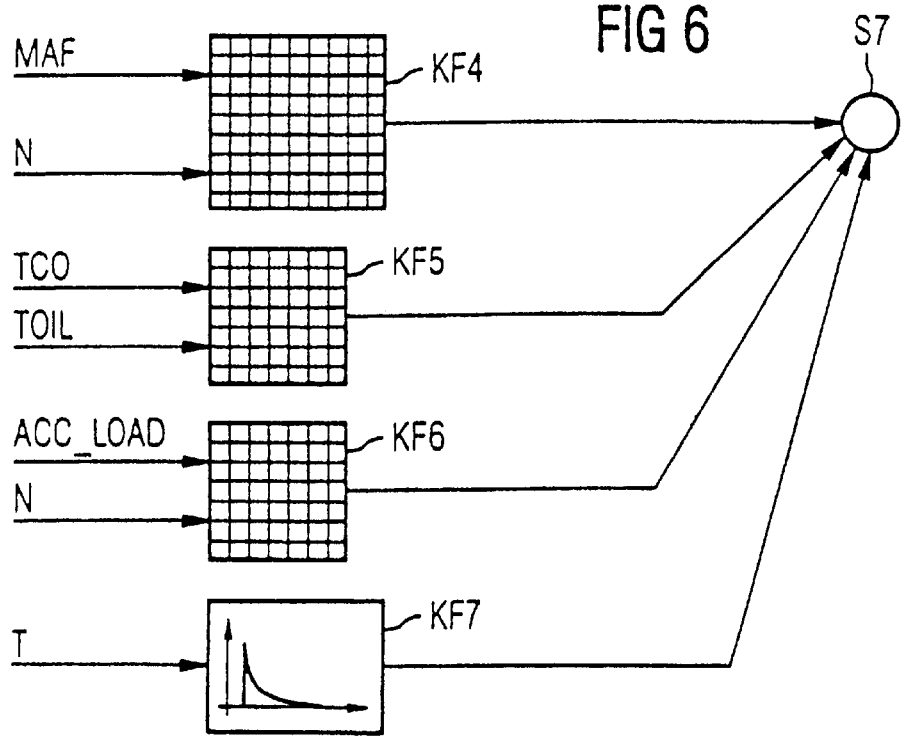

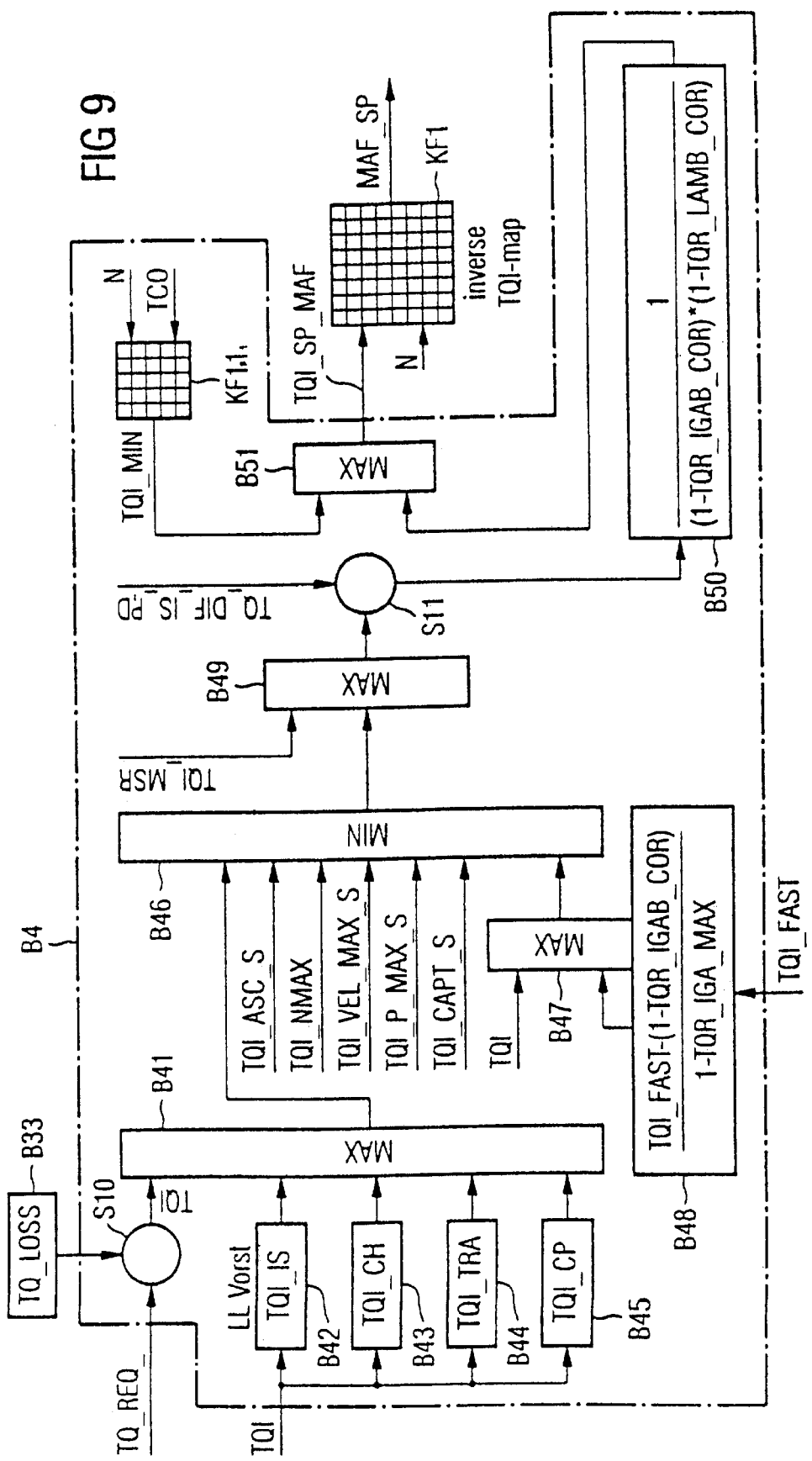

METHOD FOR CONTROLLING AN INTERNAL COMBUSTION ENGINE

CROSS-REFERENCE TO RELATED APPLICATION

This is a continuation of International Application PCT/DE97/00620, filed Mar. 26, 1997, now abandoned, which designated the United States.

BACKGROUND OF THE INVENTION

FIELD OF THE INVENTION

The invention relates to a method for controlling an internal combustion. More specifically, to a method using a rotational speed, a pedal position and engine parameters for determining a set point torque at a clutch end of a crankshaft. The set point torque is further used for deriving actuating signals for actuators of the internal combustion engine.

A method for setting the torque of a spark ignition engine during a gear shift procedure is disclosed in Published, Non-Prosecuted, German Patent Application DE 42 32 973 A1. In this method, at the start of a gear shift procedure the charge in the cylinder of an internal combustion engine is increased and at the same time the ignition angle is changed in such a way that there is no increase in torque. Starting from the time at which there is a load on the clutch again, the ignition angle is set to an optimum value again and a very rapid increase in torque is thus achieved. As a result, judder-free gear shifting is made possible. In the non-shifting mode, a master setpoint engine torque is prescribed in the method, the accelerator pedal angle being interpreted here as a desired value for the drive torque at the wheels. So that the drive torque can also actually be reached, the drive torque is corrected as a function of the assemblies connected in the system and of the kind of friction forces which have to be overcome in terms of temperature.

The method has the disadvantage that, depending on the loading of the engine by other assemblies or friction forces, the desired torque cannot always be provided by the engine.

SUMMARY OF THE INVENTION

It is accordingly an object of the invention to provide a method for controlling an internal combustion engine which overcomes the above-mentioned disadvantages of the prior art methods of this general type, which permits an internal combustion engine to operate comfortably and reliably.

With the foregoing and other objects in view there is provided, in accordance with the invention, a method for controlling an internal combustion engine, which includes: sensing a pedal value with a pedal value sensor; sensing a rotational speed with a rotational speed sensor; sensing performance parameters of an internal combustion engine with respective sensing devices; deriving a torque factor from the pedal value and the rotational speed; deriving a loss torque in dependence on the rotational speed and at least one of the performance parameters; deriving a maximum torque and a minimum torque in dependence on the rotational speed, the loss torque and at least one of the performance parameters; determining a setpoint torque for a clutch end of a crankshaft from the torque factor, the maximum torque at the clutch end of the crankshaft and the minimum torque at the clutch end of the crankshaft; and deriving an actuating signal for an actuator of the internal combustion engine from the setpoint torque.

The method according to the invention has the advantage that an available torque range can be determined from the maximum and minimum torques. At the same time, the values of the maximum torque, the minimum torque and the loss torque can also be made available to other open-loop or closed-loop control devices such as a traction controller or an ABS system, for example.

The maximum and minimum torques are determined as a function of the rotational speed, a loss torque and at least one performance parameter. Performance parameters are understood in this context to be all measurement parameters, that is to say the rotational speed, an ambient temperature, an oil temperature and an ambient pressure, for example. It is irrelevant whether the measurement parameters are measured directly by a sensor or whether they are determined from other measurement parameters and from characteristic diagram values that are determined on a test bench. Performance parameters can also be actuating parameters of controllers that are used in known engine control systems.

The torque factor is derived from the pedal value and the rotational speed. This has the advantage that depending on the rotational speed, a pedal value can be assigned different values of the torque factor. Thus, it is ensured that a vehicle in which the internal combustion engine is arranged has good driving characteristics.

In accordance with an added feature of the invention, there are the steps of calculating an indexed maximum torque in dependence on the rotational speed, an ambient pressure and an ambient temperature; and determining the maximum torque from a difference between the indexed maximum torque and the loss torque.

In accordance with an additional feature of the invention, there is the step of determining the minimum torque in dependence on an operating state of the internal combustion engine.

In accordance with another feature of the invention, there is the step of assigning a negative loss torque to the minimum torque in the operating state of an overrun fuel cut-off condition.

In accordance with a further added feature of the invention, there is the step of determining the minimum torque outside the operating state of the overrun fuel cut-off condition as a function of a deviation of the rotational speed from a setpoint idling rotational speed.

In accordance with an further additional feature of the invention, there are the steps of determining a characteristic diagram value in dependence on the rotational speed and the pedal value; and deriving the torque factor from the characteristic diagram value and an actuating value of a travel speed regulator.

In accordance with yet another feature of the invention, there are the steps of measuring an engine temperature and determining the loss torque in dependence on the engine temperature; measuring a starting engine temperature; determining a correction value for the loss torque in dependence on the starting engine temperature and time; and correcting the loss torque with the correction value.

In accordance with yet another added feature of the invention, there is the step of measuring at least one of a cooling water temperature and an oil temperature of the internal combustion engine, and determining the engine temperature from at least one of the cooling water temperature and the oil temperature.

In accordance with yet another additional feature of the invention, there is the step of deriving the loss torque from a pumping loss value, a friction loss value, a supplementary load value, and a time correction value.

In accordance with a concomitant feature of the invention, there are the steps of deriving an indexed torque from the loss torque and the setpoint torque; and determining a performance parameter torque in dependence on the indexed torque and the performance parameters.

Other features which are considered as characteristic for the invention are set forth in the appended claims.

Although the invention is illustrated and described herein as embodied in a method for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a block circuit diagram for determining a torque factor;

FIG. 4 is a graph of a characteristic diagram KF2;

FIG. 6 is a block circuit diagram for determining a loss torque;

FIG. 9 is a block circuit diagram of a correction block detail from the block circuit diagram of FIG. 2.

DESCRIPTION OF THE PREFERRED EMBODIMENTS

The same reference symbols are used for identical components throughout the figures. In all the block circuit diagrams, input parameters are summed at summing points and output parameters constitute the sum of the input parameters. In addition, in all the block circuit diagrams all the input parameters are multiplied at multiplier points and the output parameter of each multiplier point corresponds to a product of the input parameters.

Figure 1:
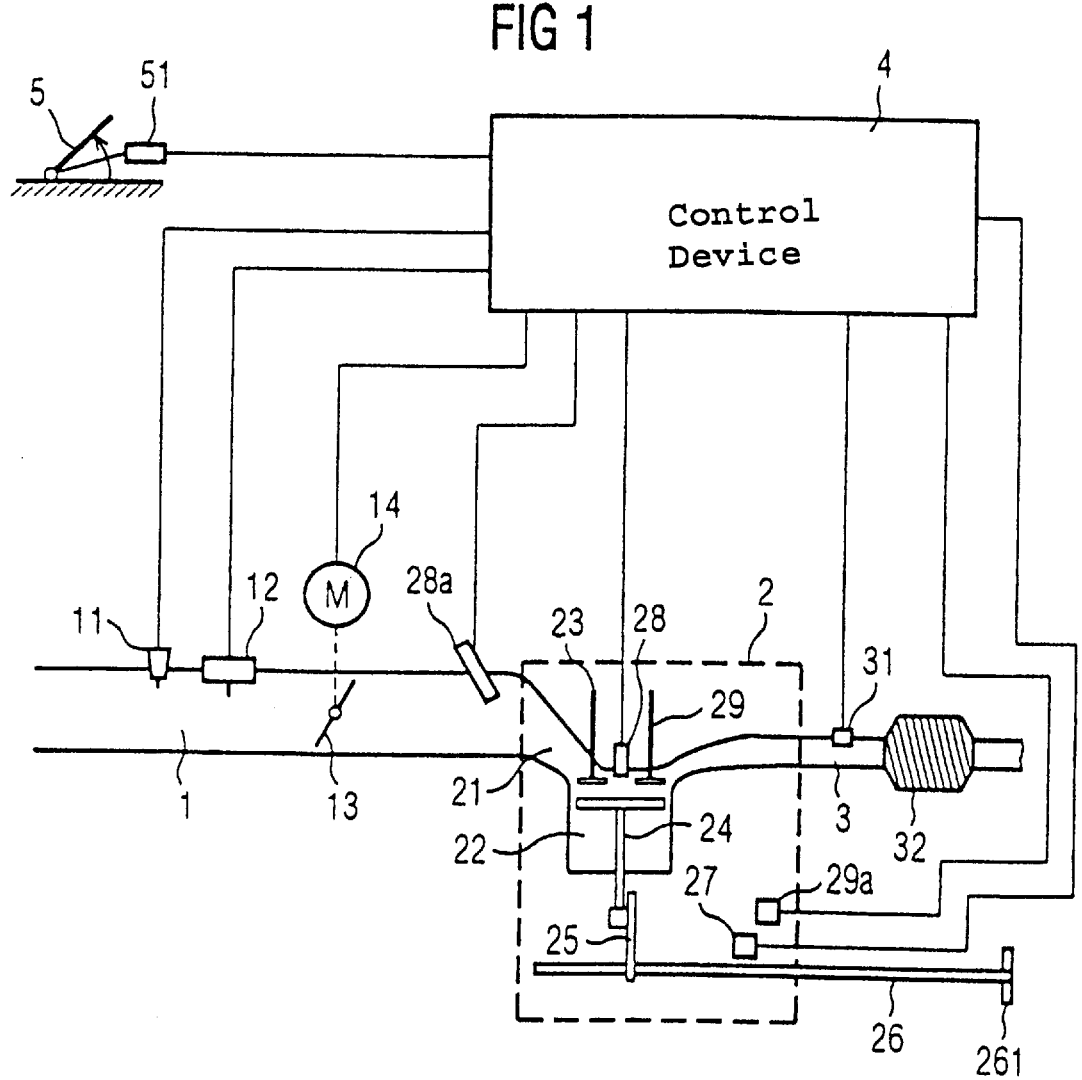
FIG. 1 is a block circuit diagram of an internal combustion engine controlled by a method according to the invention.

Referring now to the figures of the drawing in detail and first, particularly, to FIG. 1 thereof, there is shown an internal combustion engine of a motor vehicle having an intake passage 1 (FIG. 1), an engine block 2, an exhaust gas passage 3 and a control device 4 in which the method according to the invention is applied. The intake passage 1 leads into an inlet passage 21, at whose point of entry into a cylinder 22 an inlet valve 23 is disposed. For reasons of clarity, only one cylinder 22 of the internal combustion engine is represented here. The cylinder 22 has a piston 24 that is connected to a crankshaft 26 by a connecting rod 25. A rotational speed sensor 27 is disposed in the engine block 2 in such a way that it measures the rotational speed of the crankshaft 26. The crankshaft 26 has at a free end a clutch flange 261 at which a non-illustrated clutch or a non-illustrated converter of an automatic gearbox is disposed. The free end is alternatively designated as the clutch end. Below, the term clutch 261 will be used jointly for the clutch flange 261 and the clutch.

In addition, an ignition device 28 is disposed in the cylinder 22. An outlet valve 29 is disposed on an outlet opening. In addition, an oil temperature sensor 29a is disposed in the engine block 2 for measuring the temperature in the engine block 2. A lambda sensor 31 and a catalytic converter 32 are disposed in the exhaust gas passage 3. A temperature sensor 11 and an air mass flow rate meter 12 are provided upstream of a throttle valve 13 in the intake passage 1. An electromechanical actuator (referred to below as throttle valve actuator 14) acts on the throttle valve 13 and determines its degree of opening.

A pedal value sensor 51 measures a pedal value of a pedal 5. The control device 4 is electrically conductively connected to the sensors and the actuator drives which are assigned to the actuators. The sensors are, for example, the pedal value sensor 51, the temperature sensor 11, the air mass flow rate meter 12, the rotational speed sensor 27, the oil temperature sensor 29a and the lambda sensor 31. However, other sensors apart from those illustrated in FIG. 1 may also be provided. Thus, for example an intake manifold pressure sensor, for example, may also be provided, in which case the air mass flow rate meter 12 can then be dispensed with. Likewise, for example, a temperature sensor for measuring the cooling water temperature may be provided. The sensors measure the performance parameters of the internal combustion engine. The measurement signals of the sensors constitute input parameters for the control device 4.

Actuator units include in each case an actuator drive and an actuator. The actuator drive is an electromotive drive, an electromagnetic drive, a mechanical drive or a further drive known to the person skilled in the art. The actuators are formed from the throttle valve 13, an injection device 28a, the ignition device 28, a non-illustrated change-over switch between two different intake manifold lengths or as a non-illustrated device for adjusting the stroke profile, the start of the stroke or the end of the stroke of an engine valve. Below, reference is made to the actuator units in each case by the associated actuator.

The output parameters of the control device 4 correspond to the control signals for the actuators. As a function of the input parameters supplied, the control device 4 forms, in accordance with its programs, control signals for the actuators.

Figure 2:
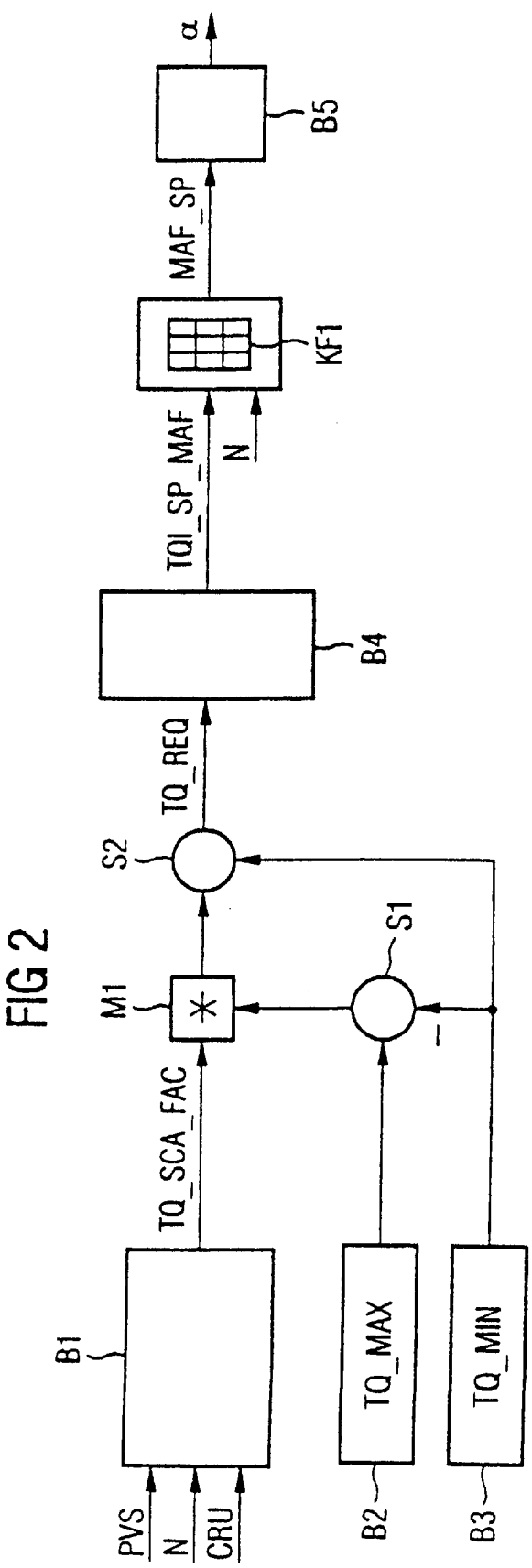
FIG. 2 is a block circuit diagram of the method.

The method for controlling the internal combustion engine is illustrated in the block circuit diagram of FIG. 2. A torque factor TQ_SCA_FAC is formed in a block B1 as a function of the pedal value PVS, the rotational speed N and an actuating value CRU of a travel speed regulator that is known per se. The torque factor constitutes a dimensionless parameter with a value range between 0 and 1. A maximum torque TQ_MAX constitutes the output parameter of the block B2. The maximum torque TQ_MAX constitutes, like all the other parameters in the block circuit diagrams, a computational parameter. The maximum torque TQ_MAX corresponds to the maximum torque that can be made available at the clutch 261 by the internal combustion engine.

An output parameter of block B3 is the minimum torque TQ_MIN that can be made available at the clutch 261 of the internal combustion engine. The minimum torque TQ_MIN can be used to brake the vehicle if it has a negative value.

The maximum torque TQ_MAX and the negative minimum torque TQ_MIN are input parameters of a summing point S1. An output parameter of a multiplier point M1 is produced from a product of the torque factor TQ_SCA_FAC and a difference between the maximum and minimum torques TQ_MAX, TQ_MIN. The output parameter and the minimum torque TQ_MIN are added at a summing point S2. An output parameter of the summing point S2 thus forms a setpoint torque TQ_REQ.

The setpoint torque TQ_REQ forms an input parameter into correction block B4 in which a performance parameter torque TQI_SP_MAF is formed as a function of the performance parameters and of a loss torque TQ_LOSS. An air mass flow rate setpoint value MAF_SP is determined from a characteristic diagram KF1 as a function of the performance parameter torque TQI_SP_MAF and the rotational speed N. A control signal a for the throttle valve actuator 14 is then determined in block B5. FIG. 3 illustrates how the torque factor TQ_SCA_FAC is determined. A characteristic diagram value TQ_SCA is determined from a characteristic diagram KF2 as a function of the rotational speed N and the pedal value PVS. FIG. 4 shows by way of example two rotational speeds $N_1$ and $N_2$ a profile of associated characteristic curves from the characteristic diagram KF2 plotted against the pedal value PVS. The rotational speed $N_1$ represents a low rotational speed (for example 1500 rpm). At such a rotational speed, the driver wishes that a high proportion of the available torque is made available to him at the clutch even when the accelerator pedal is depressed only a little, that is to say at a low pedal value. Accordingly, the characteristic curve for the rotational speed $N_1$ has a high gradient at low values of the pedal value and then approaches the value 1 of the characteristic diagram value TQ_SCA asymptotically at the maximum pedal value PVS_MAX. At a relatively high rotational speed $N_2$ (for example 4000 rpm) the driver's wish is rather for a linear rise in the torque made available to him at the clutch with the pedal value. As has been presented by this example, a different relationship between the characteristic diagram value TQ_SCA and the pedal value can be brought about as a function of the rotational speed N. Likewise, a plurality of different characteristic diagrams KF2, which are selected as a function of the performance parameters, can be stored in the control device 4. The characteristic diagram value TQ_SCA and the actuating value CRU are input parameters into block B6, in which an output parameter of the torque TQ_SCA_FAC is determined by a selection of maximum values of the input parameters.

Figure 5:
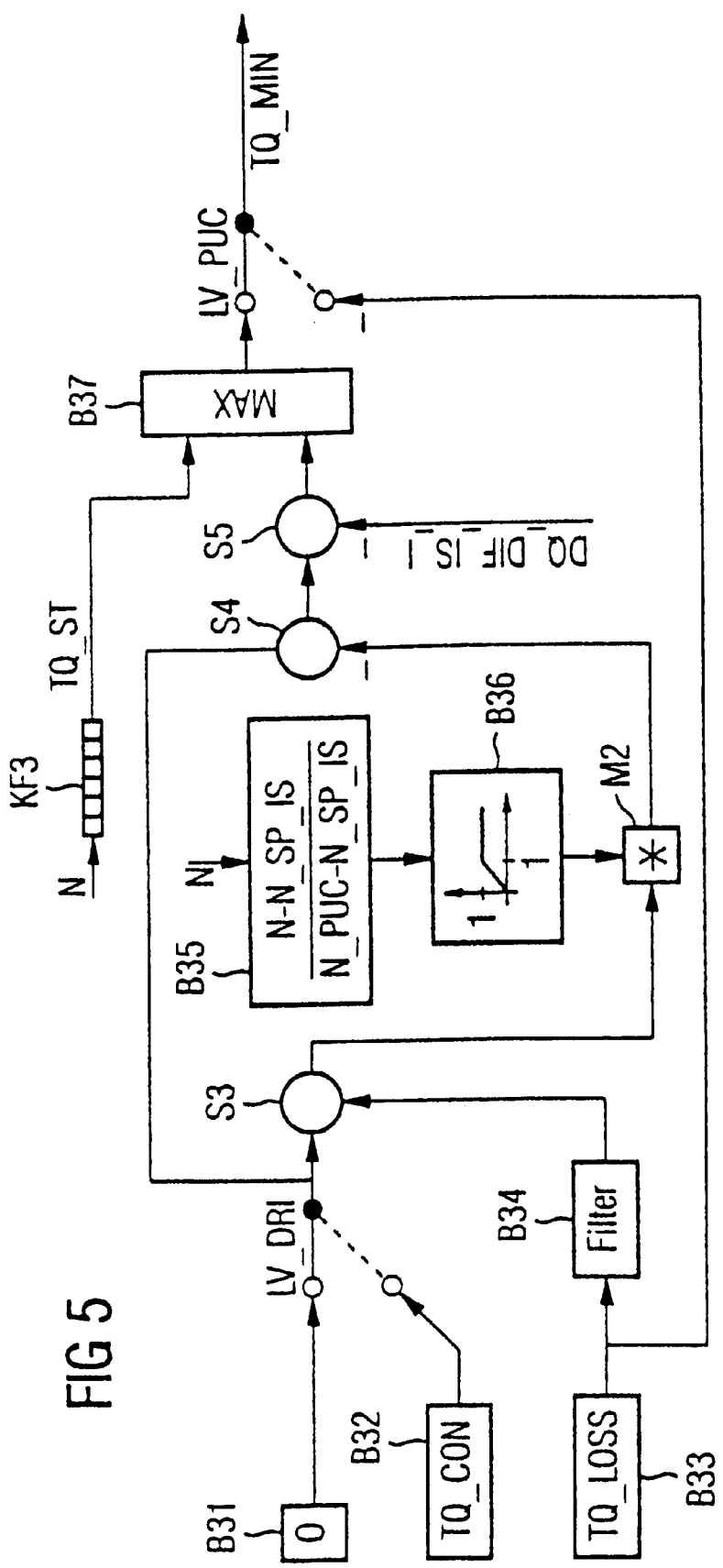
FIG. 5 is a block circuit diagram for determining a minimum torque.

FIG. 5 is a block circuit diagram for determining the minimum torque TQ_MIN at the clutch 261. In block B31, an output parameter has the value 0. An output parameter TQ_CON of block B32 represents the loss torque of a converter in an automatic gearbox. In a motor vehicle with a manually shifted gear box, the output parameter of the block 31 is always fed to a summing point S3 and a summing point S4. In a motor vehicle with an automatic gearbox, the switch LV_DRI when there is no driving position engaged is set in such a way that the output parameter of the block B31 is also fed to switches S3 and S4. When a driving position is engaged, the loss torque of the converter of the automatic gearbox must be locked. Accordingly, the switch LV_DRI is in a second position in which the output parameter TQ_CON of the block B32 is fed to the summing point S3 and S4.

The output parameter of block B33, the loss torque TQ_LOSS constitutes the input parameter of a filter block B34 in which the loss torque TQ_LOSS is subjected to a sliding average formation. Here, the averaged value of the loss torque TQ_LOSS is in each case weighted from the last calculation time period with a weighting factor which is smaller than or equal to one, and is added, weighted with one minus the weighting factor, to the value of the loss torque TQ_LOSS in the current calculation time period.

The averaged loss torque is fed to the summing point S3 whose output parameter constitutes an input parameter of the multiplier point M2. In accordance with the calculation rule that is given in block B35, a weighting factor is calculated which corresponds to the deviation of the rotational speed N from a setpoint idling rotational speed N_SP_IS weighted with the reciprocal value of the difference between the setpoint rotational speed N_PUC during an overrun fuel cut-off condition of the engine and the setpoint idling rotational speed N_SP_IS. The weighting factor is limited to the value range 0 to 1 in block B36, and is then fed as a second input parameter to the multiplier point M2. The negative output parameter of the multiplier point M2 is the second input parameter of the summing point S4. An output parameter of summing point S5, at which an integral coefficient TQ_DIF_IS_I of an idling regulator is added, is, together with the parameter TQ_ST, an input parameter of block B37 in which the output parameter is determined by a selection of a maximum value of the input parameter. An integral coefficient TQ_DIF_IS_I ensures steady-state accuracy of the minimum torque TQ_MIN.

A parameter TQ_ST is determined from a characteristic diagram KF3 as a function of the rotational speed N. At very low rotational speeds of the engine, that is to say when starting, the parameter TQ_ST assumes such a high value that, given an appropriate torque at the clutch, the centrifugal mass of the engine is accelerated, with the result that the rotational speed N increases quickly.

The minimum torque TQ_MIN corresponds in all operating states, apart from the operating state of the overrun fuel cut-off condition, to the value of the output parameter of the block B37. In the operating state of the overrun fuel cut-off condition, the minimum torque TQ_MIN corresponds to the negative value of the loss torque TQ_LOSS. Accordingly, the entire loss torque TQ_LOSS can be utilized when the vehicle is travelling downhill, during which the internal combustion engine is in the operating state of the overrun fuel cut-off condition.

If the rotational speed drops from the rotational speed N_PUC of overrun fuel cut-off conditions to the setpoint idling rotational speed N_SP_IS, the minimum torque TQ_MIN is reduced linearly to the integral coefficient TQ_DIF_IS_I and, if the driving position of the automatic gearbox is engaged, to the loss torque TQ_CON of the converter. This ensures that at rotational speeds N which are equal to or smaller than the setpoint idling rotational speed N_SP_IS, the loss torque TQ_LOSS cannot be used for braking the motor vehicle, and the running of the engine therefore then also remains stable.

Above the rotational speed N_PUC of the overrun fuel cut-off condition of the internal combustion engine, the minimum torque TQ_MIN corresponds to the negative value of the loss torque TQ_LOSS which has been subjected to sliding average formation in the filter block 34. After this, it can be used entirely for decelerating the vehicle.

The loss torque TQ_LOSS (FIG. 6) takes into account friction and pumping losses of the internal combustion engine, a temperature correction, supplementary loads such as the compressor of an air conditioning system and a time-dependent temperature coefficient. The friction and the pumping losses are determined as a function of a measured air mass flow rate MAF and the rotational speed N from a characteristic diagram KF4 and are input parameters of summing point S7. A temperature correction is determined from a characteristic diagram KF5 as a function of the engine temperature, which is preferably derived from the cooling water temperature TCO and/or the oil temperature TOIL. The temperature correction is a second input parameter of the summing point S7. The supplementary load is determined from a characteristic diagram KF6 as a function of a supplementary load value ACC_LOAD and the rotational speed N and is fed to the summing point S7 as a third input parameter. Time-dependent temperature coefficients are stored in the characteristic diagram KF7. The temperature coefficients indicate the proportion of the loss torque TQ_LOSS in the starting and warming-up phase of the internal combustion engine which is due to the fact that the oil must firstly be brought into circulation, the pressure must be built up at the lubrication points of the internal combustion engine and the oil is still very viscous at the beginning.

Furthermore, preferably a starting engine temperature is measured in the starting operating state of the internal combustion engine and a correction value for the loss torque TQ_LOSS which depends on the starting engine temperature and the time is determined.

In addition, when the loss torque is determined, the torque proportion that is required by a generator of the motor vehicle to keep the vehicle's electrical voltage approximately constant can also be taken into account. It is self-evident that the determination of the loss torque can also be used and applied independently.

Figure 7:
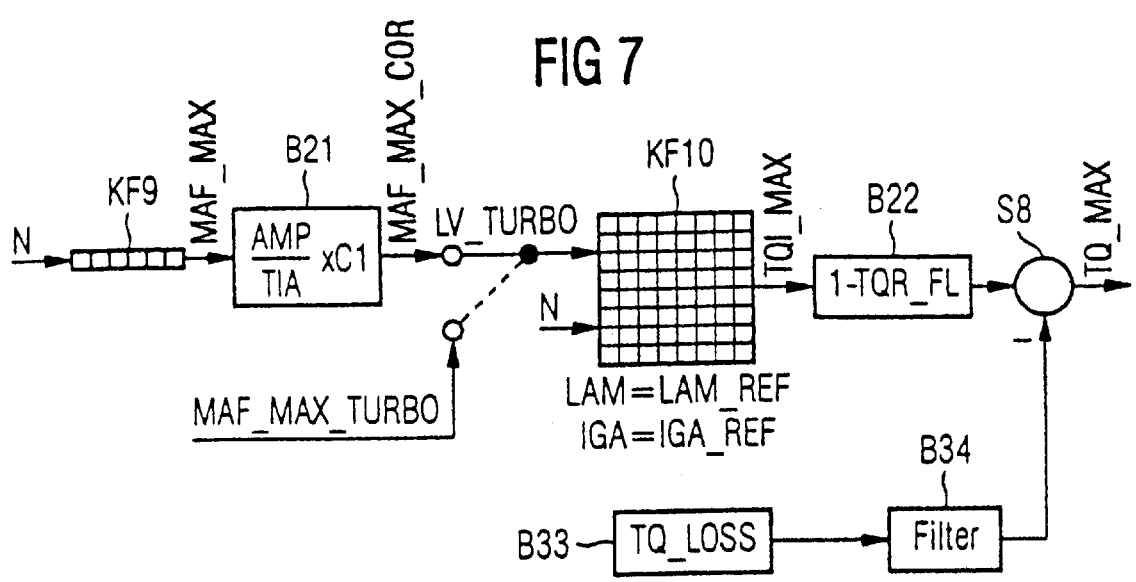
FIG. 7 is a block circuit diagram for determining a maximum torque.

The maximum torque TQ_MAX at the clutch 261 is determined in the way illustrated in FIG. 7. A value MAF_MAX of the maximum air flow at a reference temperature (for example 293 K) and at a reference pressure (for example 1013 mbar) is read out from the characteristic diagram KF9 as a function of the rotational speed N. The value MAF_MAX is dependent on the rotational speed, since, for example, at certain rotational speeds in the intake passage better charging as a recylinders 22 is ensured as a result of resonance effects. Whereas at low rotational speeds poor charging of the cylinders 22 take place as a result of valve overlaps of the engine valves. The value MAF_MAX is corrected in block B21 as a function of the ambient temperature TIA, the ambient pressure AMP and a constant C1 (for example 293/1013). In internal combustion engines without a turbocharger a corrected value MAF_MAX_COR constitutes an input parameter for the characteristic diagram KF10. The other input parameter for the characteristic diagram KF10 is the rotational speed N. In internal combustion engines with turbochargers, a value MAF_MAX_TURBO constitutes, in addition to the rotational speed N, an input parameter into the characteristic diagram KF10. The values of the characteristic diagram KF10 correspond to the values of an indexed maximum torque TQI_MAX at a reference lambda value LAM_REF (for example 0.9) and at a reference ignition angle IGA_REF. An indexed maximum torque TQI_MAX is understood in this context to be the torque produced purely as a result of the combustion in the cylinder without taking into account any losses. The maximum indexed torque TQI_MAX is corrected in the block B22 with a correction factor 1-TQR_FL which takes into account the current lambda value and the ignition angle value. The value of the loss torque TQ_LOSS is deducted from the corrected indexed maximum torque TQI_MAX at a summing point S8. An output parameter of the summing point S8 then corresponds to the maximum torque TQ_MAX.

Figure 8:
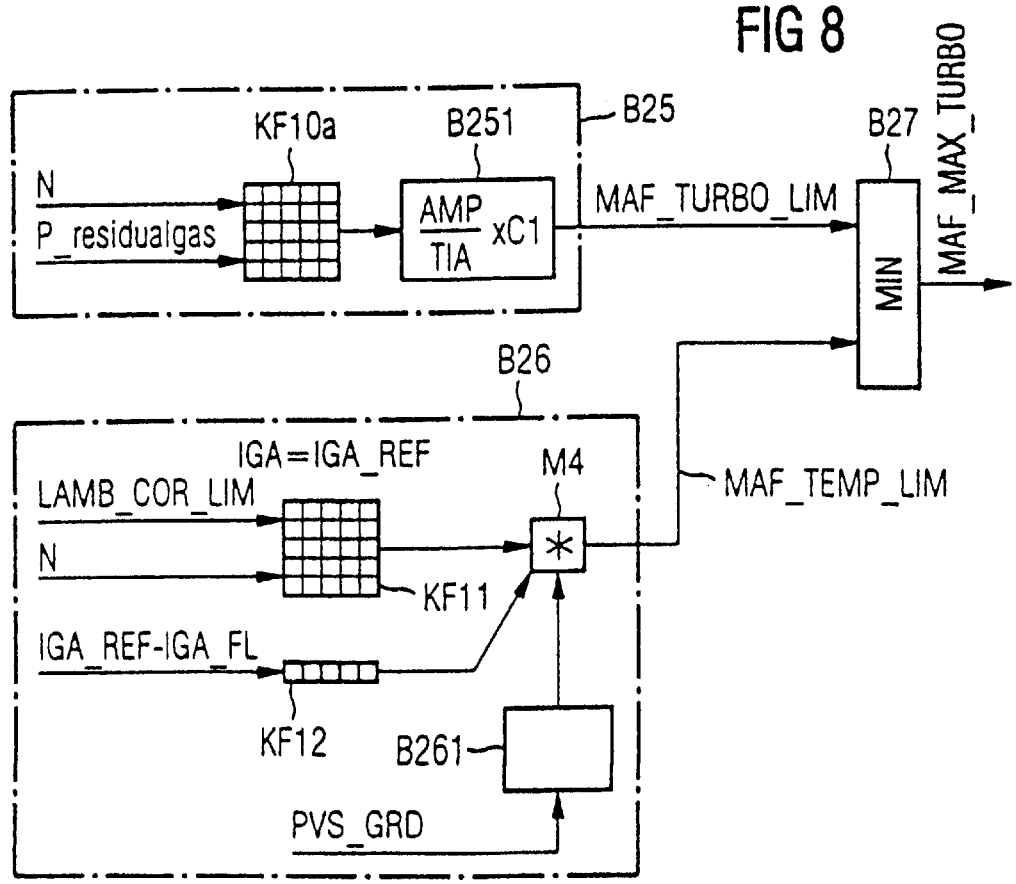
FIG. 8 is a block circuit diagram for determining a maximum air mass flow rate in the internal combustion engine with a turbocharger.

In an internal combustion engine with a turbocharger, the value MAF_MAX_TURBO of the maximum air mass flow rate is determined in the way illustrated in FIG. 8. The maximum air mass flow rate MAF_TURBO_LIM in the cylinder for mechanical protection (rotational speed limit, pumping limit) of the turbocharger is determined from a characteristic diagram KF10a as a function of the rotational speed N and the residual gas partial pressure P_RESID for the reference pressure (for example 1013 [mbar]) and the reference temperature (for example 293 [K]) for which the characteristic diagram KF10a has been recorded by steady-state measurements. The value is adapted to the ambient pressure AMP and to the ambient temperature TIA in the block B251. _The maximum air mass flow rate MAF_TEMP_LIM for temperature protection is calculated as follows: a value at which the permissible temperature of the components is not exceeded at the reference ignition angle IGA_REF is determined from a characteristic diagram KF11 as a function of a full-load excess air factor LAMB_COR_LIM, which corresponds to the lambda value at full load, and as a function of the rotational speed N. The value constitutes an input parameter into a multiplier point M4, an output parameter of which is a maximum air mass flow rate MAF_TEMP_LIM for temperature protection. A further input parameter into the multiplier point constitutes a factor which is the output parameter of the characteristic diagram KF12, and which is accordingly dependent on the difference between the reference ignition angle IGA_REF and the ignition angle at full load IGA_FL.

In order to permit the maximum air mass flow rate MAF_TEMP_LIM to be exceeded for a short time for temperature protection, a further factor, which is the output parameter of the block B261, is added at the multiplier point M4. As a function of the gradient PVS_GRD of the pedal value PVS, the output parameter of block B261 is, if appropriate, increased significantly above the value 1 for a brief period of time. As a result, a very high air mass flow rate into the cylinder 22 is possible for a brief time without causing thermal damage to the turbocharger and/or to the internal combustion engine. This is a large advantage in particular during a passing maneuver of the motor vehicle.

In block B27, a minimum value selection from the input parameters MAF_TEMP_LIM and MAF_TURBO_LIM is performed. An output parameter of the block B27 then constitutes the value of the maximum air mass flow rate MAF_MAX_TURBO in an internal combustion engine with a turbocharger.

The block circuit diagram of FIG. 9 illustrates how an air mass flow rate setpoint value can be determined from the setpoint torque TQ_REQ.

The setpoint torque TQ_REQ and the loss torque TQ_LOSS are the input parameters of summing point S10 whose output parameter is then an indexed torque TQI. In the correction block B4, the indexed torque TQI is corrected as a function of performance parameters. Thus, in block B41, a maximum value selection of all the input parameters is carried out. The input parameters are values for derivative-action torques, that is to say a defined increase in the charge in the cylinder 22 in comparison with the indexed torque TQI is performed as a function of the indexed torque TQI. Such derivative-action torques are, for example, output parameters of block B42 in which a derivative-action torque TQI_IS is determined as a function of a precontrol parameter of the idling regulator, an output parameter of block B43 in which a derivative-action torque TQI_CH is determined as a function of the heating of the catalytic converter, an output parameter of block B44 in which a derivative-action torque TQI_TRA is determined in order to limit juddering vibrations of the motor vehicle, and an output parameter of block B45 in which a value of the derivative-action torque TQI_CP for the venting of the fuel tank is determined.

The advantage of the derivative-action torques is explained in more detail with reference to the damping of the juddering vibrations in the motor vehicle. In the case of the derivative-action torque TQI_TRA, the charge in the cylinder 22 is correspondingly increased, and at the same time the ignition angle is adjusted in the retarded direction, with the result that the torque at the clutch corresponds approximately to the indexed torque TQI. As a function of other performance parameters (for example a gradient of the rotational speed N), a modulation of the torque in the positive and negative directions is carried out in anti-phase to the gradient of the rotational speed N by intervening in the ignition angle in real time and as a result the juddering vibrations are damped.

The output parameter of the block B41 is an input parameter into block B46 in which a minimum value selection of the input parameters is then performed. By the minimum value selection, it is ensured that an output parameter of the block B46 does not exceed any safety-specific value as a function of the operating state of the internal combustion engine. A value TQI_ASC_S corresponds to the limitation of the indexed torque TQI by a traction controller. A value TQI_NMAX corresponds to a rotational speed limitation, an input parameter TQI_VEL_MAX_S corresponds to a speed limitation, a value of the input parameter TQI_P_MAX corresponds to a power limitation, and a value TQI_CAT_P corresponds to protection of the catalytic converter.

An input parameter TQI_FAST into block B48 corresponds to the indexed torque which has to be set at a minimum value by adjusting the ignition angle in the retarded direction. Thus, for example in the case of a gearbox intervention, rapid torque co-ordination is necessary. For this purpose, in the block B48 the maximum acceptable torque, determined as a function of a basic reference ignition-angle factor TQR_IGAB_COR and an ignition-angle torque reduction factor TQR_IGA_MAX, is obtained in accordance with the calculation rule specified in said block. The maximum acceptable torque and the indexed torque TQI are then input parameters for the block B47 whose output parameter is determined by a maximum value selection of the input parameters, and which output parameter in turn constitutes an input parameter for the block 46.

By use of the maximum value selection of the input parameters of block B49, namely the output parameter of the block B46 and a value TQI_MSR, that constitutes an actuating parameter that is determined by an engine torque controller which is known per se, it is ensured that the output parameter of the block B49 does not drop below a minimum value. The output parameter of the block B49 is an input parameter of summing point S11, at which a P component and a D component of the actuating parameter TQ_DIF_IS_P,D of the idling regulator is added.

The output value of the summing point S11 is corrected in block B50 as a function of a basic reference ignition-angle factor TQR_IGAB_COR_TQR_IGAB_COR and a basic reference lambda factor TQR_LAMB_COR, and is then fed as input parameter to the block B41. The second input parameter of the block B51 is a value TQI_MIN, which is determined from a characteristic diagram KF13 as a function of the rotational speed and of the cooling water temperature TCO. The value ensures that the internal combustion engine does not drop below its operating limit below which it is not possible for the engine to run in a stable fashion. The output value of the block B41 is then the input value of the characteristic diagram KF1, in which the corresponding air mass flow rate setpoint value MAF_SP is determined.

We claim:

1. A method for controlling an internal combustion engine, which comprises:

sensing a pedal value with a pedal value sensor;

sensing a rotational speed with a rotational speed sensor;

sensing performance parameters of an internal combustion engine with respective sensing devices;

deriving a torque factor from the pedal value and the rotational speed;

deriving a loss torque in dependence on the rotational speed and at least one of the performance parameters;

deriving a maximum torque and a minimum torque in dependence on the rotational speed, the loss torque and at least one of the performance parameters;

determining a setpoint torque for a clutch end of a crankshaft from the torque factor, a maximum torque at the clutch end of the crankshaft and a minimum torque at the clutch end of the crankshaft; and deriving an actuating signal for an actuator of the internal combustion engine from the setpoint torque.

2. The method according to claim 1, which comprises:

calculating an indexed maximum torque in dependence on the rotational speed, an ambient pressure and an ambient temperature; and determining the maximum torque from a difference between the indexed maximum torque and the loss torque.

3. The method according to claim 1, which comprises determining the minimum torque in dependence on an operating state of the internal combustion engine.

4. The method according to claim 3, which comprises assigning a negative loss torque to the minimum torque in the operating state of an overrun fuel cut-off condition.

5. The method according to claim 3, which comprises determining the minimum torque outside the operating state of an overrun fuel cut-off condition as a function of a deviation of the rotational speed from a setpoint idling rotational speed.

6. The method according to claim 1, which comprises:

determining a characteristic diagram value in dependence on the rotational speed and the pedal value; and deriving the torque factor from the characteristic diagram value and an actuating value of a travel speed regulator.

7. The method according to claim 1, which comprises:
measuring an engine temperature and determining the loss torque in dependence on the engine temperature;
measuring a starting engine temperature;
determining a correction value for the loss torque in dependence on the starting engine temperature and time; and
correcting the loss torque with the correction value.

8. The method according to claim 7, which comprises measuring at least one of a cooling water temperature and an oil temperature of the internal combustion engine, and determining the engine temperature from at least one of the cooling water temperature and the oil temperature.

9. The method according to claim 1, which comprises deriving the loss torque from a pumping loss and friction loss value, a supplementary load value, and a time correction value.

10. The method according to claim 1, which comprises:
deriving an indexed torque from the loss torque and the setpoint torque; and
determining a performance parameter torque in dependence on the indexed torque and the performance parameters.

* * * * *